(12) United States Patent
Zheng et al.

(10) Patent No.: US 12,158,560 B2
(45) Date of Patent: Dec. 3, 2024

(54) ATMOSPHERIC PARAMETER MEASURING DEVICE FOR AIR SOUNDING

(71) Applicant: BEIHANG UNIVERSITY, Beijing (CN)

(72) Inventors: Dezhi Zheng, Beijing (CN); Dapeng Li, Beijing (CN); Shuai Wang, Beijing (CN); Xianbin Cao, Beijing (CN)

(73) Assignee: BEIHANG UNIVERSITY

( * ) Notice: Subject to any disclaimer, the term of this patent is extended or adjusted under 35 U.S.C. 154(b) by 346 days.

(21) Appl. No.: 17/793,004

(22) PCT Filed: Jun. 23, 2020

(86) PCT No.: PCT/CN2020/097711
§ 371 (c)(1),
(2) Date: Jul. 14, 2022

(87) PCT Pub. No.: WO2021/036443
PCT Pub. Date: Mar. 4, 2021

(65) Prior Publication Data
US 2023/0048523 A1 Feb. 16, 2023

(30) Foreign Application Priority Data

Aug. 30, 2019 (CN) .......................... 201910813223.2

(51) Int. Cl.
*G01W 1/08* (2006.01)
*B64C 39/02* (2023.01)
*G01W 1/02* (2006.01)

(52) U.S. Cl.
CPC ............... *G01W 1/08* (2013.01); *B64C 39/02* (2013.01); *G01W 1/02* (2013.01)

(58) Field of Classification Search
CPC ...... B64C 39/02; E21B 43/2607; G01W 1/02; G01W 1/08; B64U 2101/15
See application file for complete search history.

(56) References Cited

U.S. PATENT DOCUMENTS 8,888,457 B2 * 11/2014 Luo .................... A63H 27/12
244/17.23
9,730,339 B2 * 8/2017 Burke .................... B64G 1/66

FOREIGN PATENT DOCUMENTS

CN           205581333 U  *  9/2016

* cited by examiner

*Primary Examiner* — Manish S Shah
*Assistant Examiner* — Sharad Timilsina
(74) *Attorney, Agent, or Firm* — Jose Cherson Weissbrot

(57) ABSTRACT

An atmospheric parameter measuring device includes a cone top, a balance rod an upper propeller, a lower propeller, a transmission module, an accelerating module, a DC generator, an object-carrying shell, an inertial generation module, a wireless energy-carrying communication module, a sensor carrier, a base, an airbag and a low-power-consumption sensor. Electric energy can generate by using four methods of wind energy, microwave, inertia and solar energy, so the energy supply for the carried low-power-consumption sensor can be ensured and the measuring device can generate electric energy at day and night to ensure the working state of the carried low-power-consumption sensor and measure the atmospheric temperature, humidity, wind speed, intensity of pressure and cloud and water grain shape parameters at the current position conveniently; the measuring device can float in the air by the lift force provided by the rotation of the two propellers.

13 Claims, 6 Drawing Sheets

ATMOSPHERIC PARAMETER MEASURING DEVICE FOR AIR SOUNDING

TECHNICAL FIELD

The present invention relates to the technical field of atmospheric parameter measurement, and in particular relates to an atmospheric parameter measuring device with a self-generation function used for air sounding.

BACKGROUND

Generally, area from the ground to 20 km above is defined as an aviation space; the area above 100 km from the ground is defined as aerospace; and the area 20-100 km above the ground is defined as a near space, which is a transition area of the aviation space and the aerospace, an area that has not been explored on a large scale by mankind, and an area of great strategic significance and utilization value. This area is higher than a fly zone for a commercial aircraft, but lower than an orbit satellite. Although some aircraft, satellites and spacecraft are technically capable of reaching the near space, a lot of fuel must be consumed for staying in the area for extended time.

With the rapid development of modern high technologies, information warfare space is no longer limited to land, sea and low altitude, and the near space has also become a new battlefield for a modern warfare, making it is an important link of a national security system. However, as an effective link for connecting an air-space battlefield, the near space will play a key role in air-space integrated joint operation, so it has attached great importance from more and more countries. In the near space, the measurement for various atmospheric parameters depends on the deployment of a sensor, and how to deploy a great number of sensor nodes in the near space is the problem to be solved at present.

In the existing atmospheric parameter measuring device for air sounding, a method for carrying a lithium battery and a solar battery panel is usually adopted for energy supply, but this will increase the weight of an aerostat, and at the same time, the existing atmospheric parameter measuring device is charged by the solar energy, so it cannot work at night. In addition, with a certain limitation for working space and position, the existing atmospheric parameter measuring device for air sounding is inconvenient to adjust in time according to needs. Moreover, the existing atmospheric parameter measuring device for air sounding has higher cost, if the atmospheric parameter is measured in a large scale, the measuring cost will be higher.

SUMMARY

In order to solve the deficiencies of the prior art, the present disclosure provides an atmospheric parameter measuring device for air sounding, and the lift force provided by the rotation of two propellers enables the atmospheric parameter measuring device to float in the air. With a small size and light weight, a low-power-consumption sensor is conveniently carried for a large-scale air sounding atmospheric parameter measuring experiment, including aerospace, a near space and an aviation space.

The specific technical solution of the present disclosure is as follows: an atmospheric parameter measuring device for air sounding includes a cone top, a balance rod, an upper propeller, a lower propeller, a transmission module, an accelerating module, a DC generator, an object-carrying shell, an inertial generation module, a wireless energy-carrying communication module, a sensor carrier, a base, an airbag and a low-power-consumption sensor, wherein The cone top is connected to the balance rod through a thread, the bottom of the balance rod is successively connected to the upper propeller and the lower propeller, which are bamboo-copter like structures and have the opposite rotation directions;

The transmission module includes an upper transmission rod, a lower transmission rod, a ball bearing and a cone gear, the upper transmission rod is sleeved outside the lower transmission rod, the bottom of the upper transmission rod is a gear plate, the upper propeller is connected to the lower transmission rod, the lower propeller is connected to the upper transmission rod, the rotation direction of the upper transmission rod is opposite to that of the lower transmission rod, the ball bearing is sleeved at the bottom of the lower transmission rod, and the cone gear is sleeved on the ball bearing;

The accelerating module includes a gear ring and a star gear meshing with the gear ring, the cone gear is capable of meshing with the gear plate at the bottom of the upper transmission rod and the gear ring, so as to combine the rotating force of the upper transmission rod and the lower transmission rod and deliver the rotating force to the gear ring, and the gear ring drives the star gear to rotate so as to increase the rotating speed;

The star gear is fixedly connected to a rotor of the DC generator, so as to drive the rotor of the DC generator to rotate, and cut a magnetic induction line to generate electric energy, and the bottom of the DC generator is fixed with the top of the object-carrying shell by a bolt;

The object-carrying shell is a cylindrical empty shell, and four axial slots are uniformly arranged on an outer wall of the object-carrying shell;

Screw holes that correspond to the axial slots of the object-carrying shell are respectively formed outside the inertial generation module, the wireless energy-carrying communication module and the sensor carrier, and the inertial generation module, the wireless energy-carrying communication module and the sensor carrier are movably installed inside the object-carrying shell through the bolt and the axial slots of the object-carrying shell, and in layered arrangement;

The inertial generation module includes a spherical shell wound with a coil outside, a magnetic solid sphere capable of moving freely in the spherical shell and a chassis, when the measuring device floats on front, rear, left and right sides in the air, the magnetic solid sphere swings, and the magnetic induction line of the spherical shell wound with the coil outside is cut to generate induced electromotive force;

The wireless energy-carrying communication module is configured to collect the energy of wireless electromagnetic wave in the air, at the same time, capable of performing wireless communication with a terminal;

The sensor carrier is configured to carry the low-power-consumption sensor, the low-power-consumption sensor includes a temperature sensor, a humidity sensor, a wind speed sensor, an atmospheric pressure sensor and a cloud and water grain shape sensor;

The base is fixedly connected to the bottom of the object-carrying shell through the bolt.

Further, an output end of the DC generator is carried with load with adjustable power, and the rotating speed of the DC generator is controlled by adjusting the load power.

Further, an annular airbag is arranged on the base.

Further, a layer of solar energy collection material is coated on the surfaces of the cone top, the upper propeller, the lower propeller, the transmission module, the accelerating module, the object-carrying shell and the base, so as to collect solar energy in an environment and supply power for the low-power-consumption sensor.

Further, a frequency band of the wireless electromagnetic wave of the wireless energy-carrying communication module for collecting energy includes a 6G frequency band, and a frequency band with 0.3 GHz-3 THz microwave.

Further, the measuring device is capable of working in the aerospace or the near space or the aviation space.

The present disclosure has the following beneficial effects:

1. Electric energy can generate day and night by using four generation methods of wind energy, microwave, inertia and solar energy, so the energy supply for the low-power-consumption sensor can be ensured;

2. The atmospheric parameter measuring device for air sounding provided by the present disclosure adopts a bamboo-copter like structure, the lift force provided by the rotation of two propellers enables the measuring device to float in the air. With a small size and light weight, the low-power-consumption sensor is conveniently carried for a large-scale air sounding atmospheric parameter measuring experiment;

3. The installation positions of the inertial generation device, the wireless energy-carrying communication module and the sensor carrier may be adjusted by the axial slots outside the object-carrying shell, thereby changing the center of gravity of the whole measuring device and making the float flying more stable;

4. In addition to generation, reverse control may be also realized. The rotating speed of the DC generator is controlled by the load with adjustable power, and then the float flying state of the measuring device is adjusted;

5. The measuring device provided by the present disclosure is capable of working in the aerospace or the near space or the aviation space.

BRIEF DESCRIPTION OF THE DRAWINGS

To better clarify the embodiment the present disclosure or the technical solution in the prior art, the drawings required to illustrate the embodiments will be simply described below. The features and advantages of the present disclosure will be understood clearly with reference to the drawings, which are illustrative and not understood as any limitation to the present disclosure. Those ordinarily skilled in the art can obtain other drawings without creative labor on the basis of those drawings. Wherein.

REFERENCE SIGNS

1—cone top, 2—balance rod, 3—upper propeller, 4—lower propeller, 5—transmission module, 51—upper transmission rod, 52—lower transmission rod, 53—ball bearing, 54—cone gear, 6—accelerating module, 61—gear ring, 62—star gear; 7—DC generator, 8—object-carrying shell, 9—inertial generation module, 91—spherical shell, 92—solid sphere, 93—chassis, 10—wireless energy-carrying communication module, 11—sensor carrier, 12—base, 13—airbag.

DETAILED DESCRIPTION OF THE EMBODIMENTS

In order to understand the above purposes, features and advantages of the present disclosure clearly, the present disclosure will be further described below in details in combination with the drawings. It is to be noted that embodiments in the present disclosure and features in the embodiments may be combined with each other without conflict.

A lot of concrete details are described below so as to understand the present disclosure fully, however the present disclosure may be implemented by adopting other methods different from the method described herein, therefore the protection scope of the present disclosure is not limited by the specific embodiments disclosed below.

Figure 1:
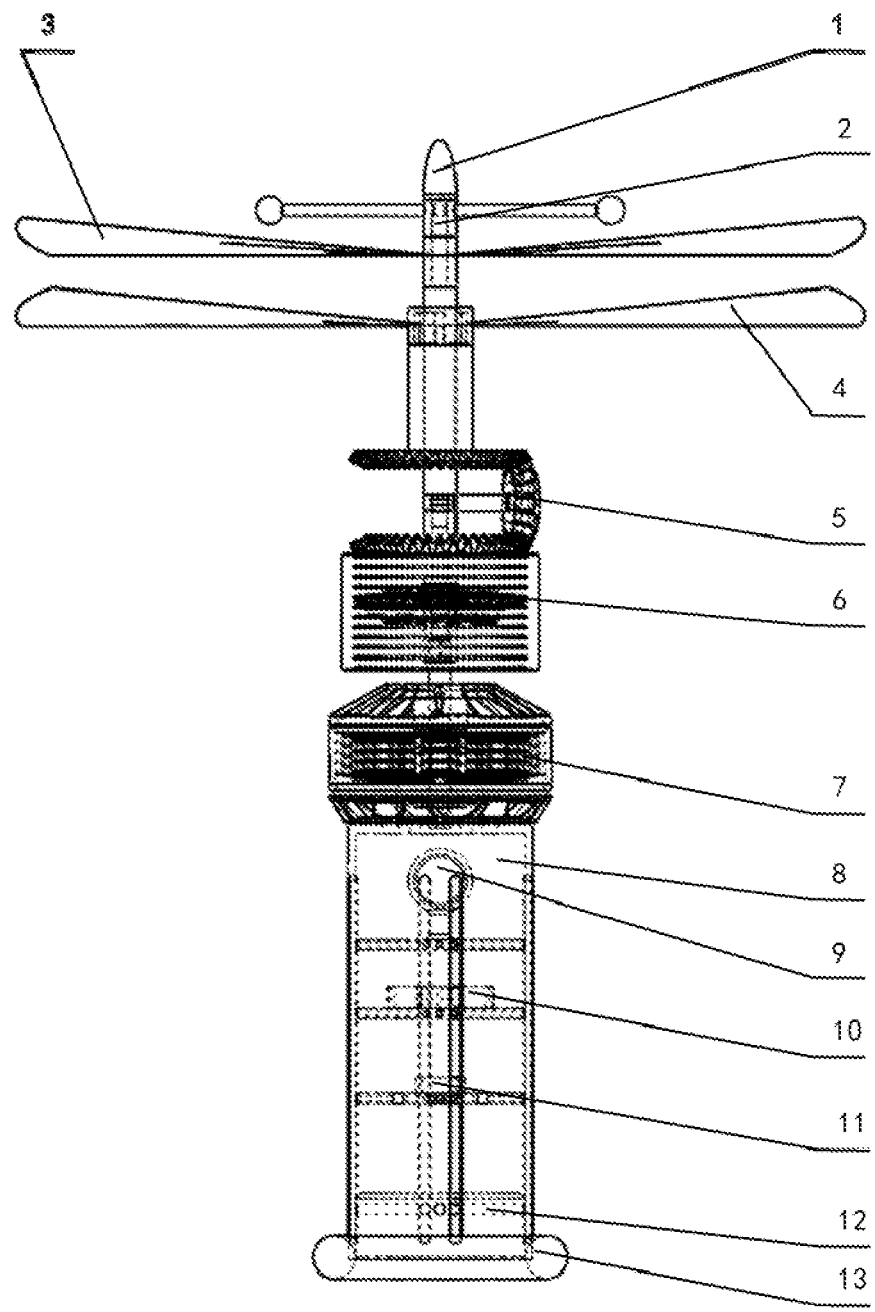
FIG. 1 is an overall structure drawing of an atmospheric parameter measuring device in the present disclosure.

The overall structure of the present disclosure, as shown in FIG. 1, is a bamboo-copter like structure, an atmospheric parameter measuring device with a self-generation function used for air sounding may carry various low-power-consumption sensors and supply power to the low-power-consumption sensors, so that the low-power-consumption sensors may work in aerospace, a near space and an aviation space.

Figure 2:
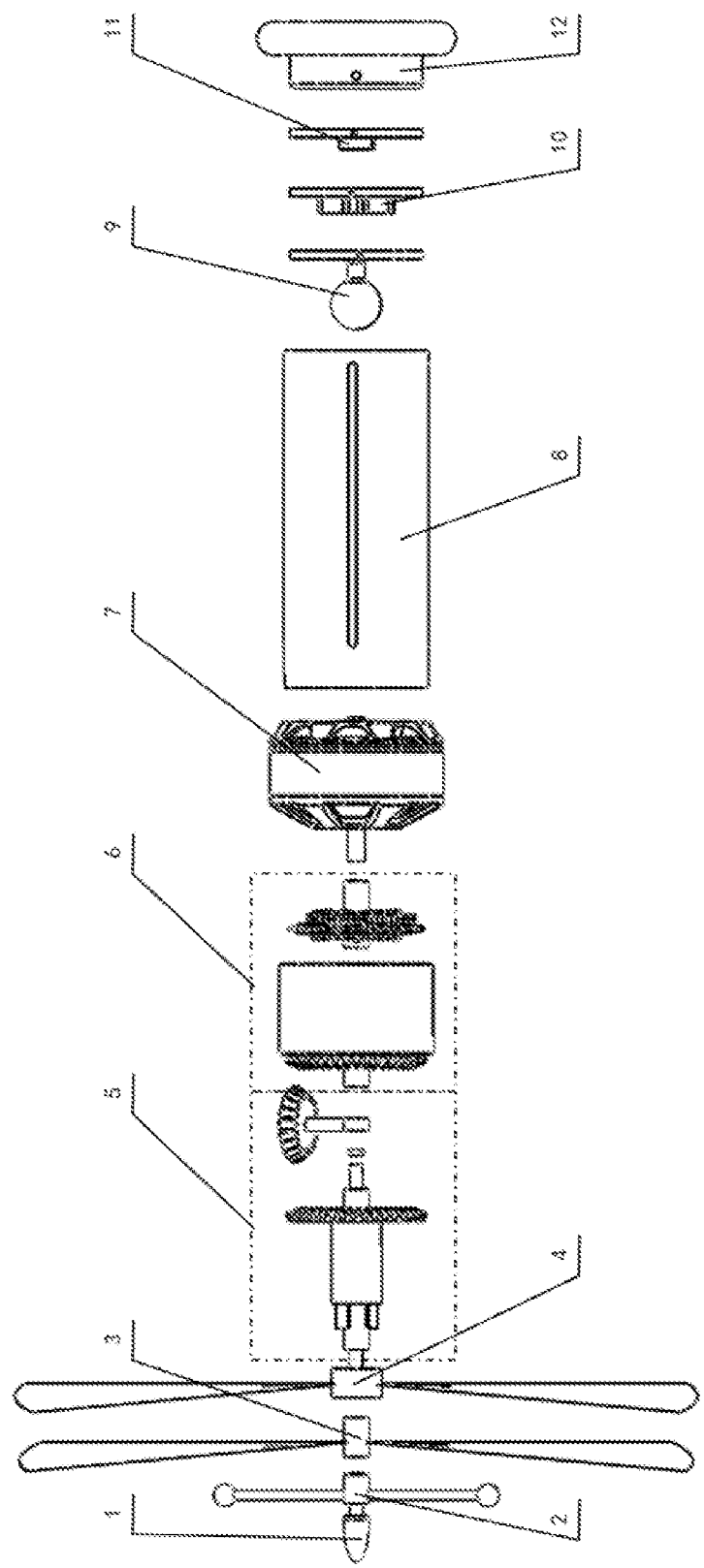
FIG. 2 is a breakdown drawing of FIG. 1.

Specifically, as shown in FIG. 2, an atmospheric parameter measuring device for air sounding includes a cone top 1, a balance rod 2, an upper propeller 3, a lower propeller 4, a transmission module 5, an accelerating module 6, a DC generator 7, an object-carrying shell 8, an inertial generation module 9, a wireless energy-carrying communication module 10, a sensor carrier 11, a base 12, an airbag 13 and a low-power-consumption sensor (not shown), wherein the cone top 1 is connected to the balance rod 2 through a thread, the bottom of the balance rod 2 is successively connected to the upper propeller 3 and the lower propeller 4, which are bamboo-copter like structures and have the opposite rotation directions; when the measuring device floats in the air, the balance rod 2 balances the whole measuring device by itself rotation, so that the measuring device is in the normal float flying state; and under the effect of the wind power and the gravity, the upper propeller 3 and lower propeller 4 rotate to provide lift force for the measuring device, and the two propellers rotate oppositely so as to cancel the rotation of the measuring device when providing the lift force.

Figure 3:
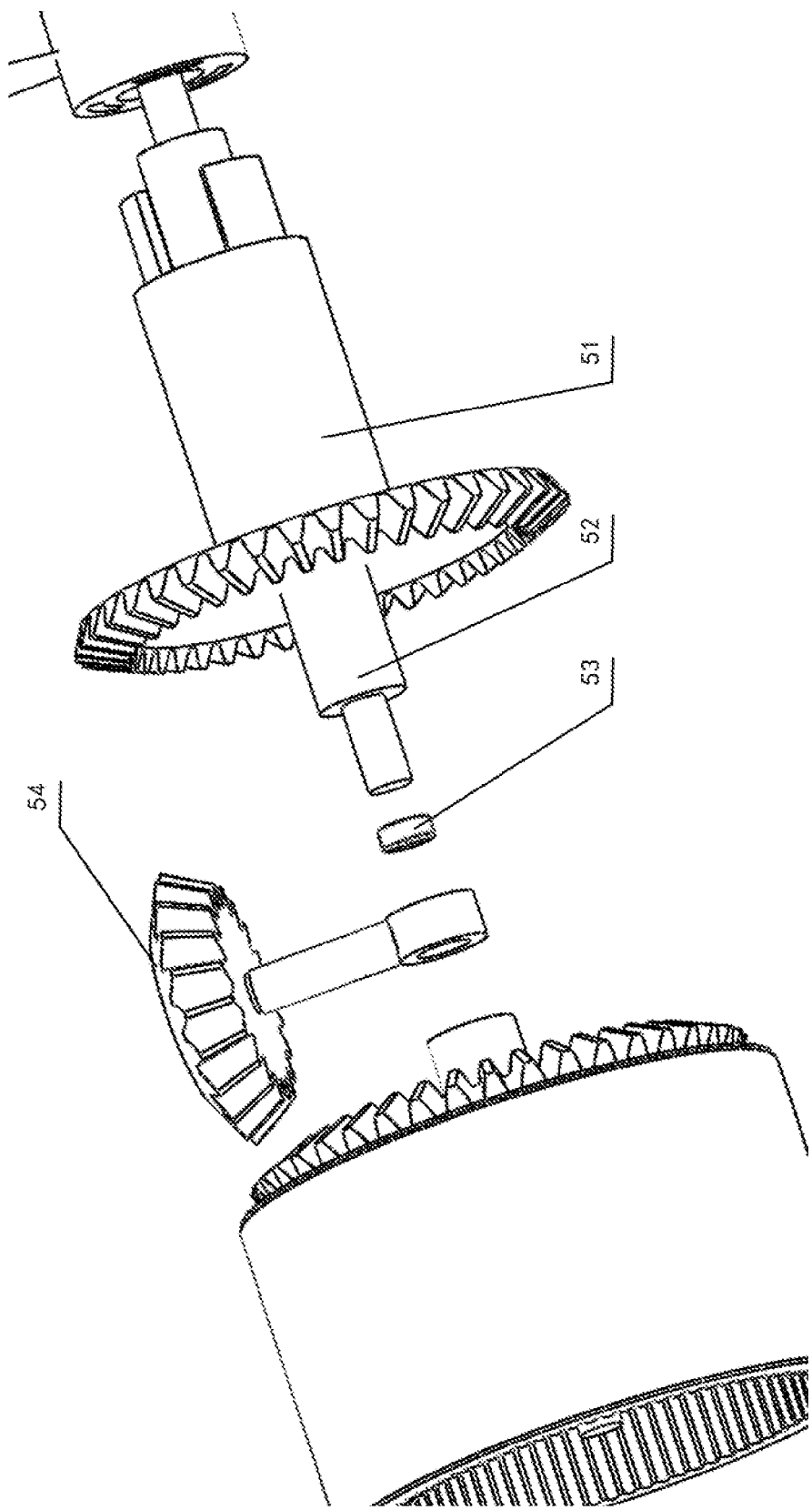
FIG. 3 is a connecting schematic diagram of a ball bearing of an atmospheric parameter measuring device in the present disclosure.
Figure 4:
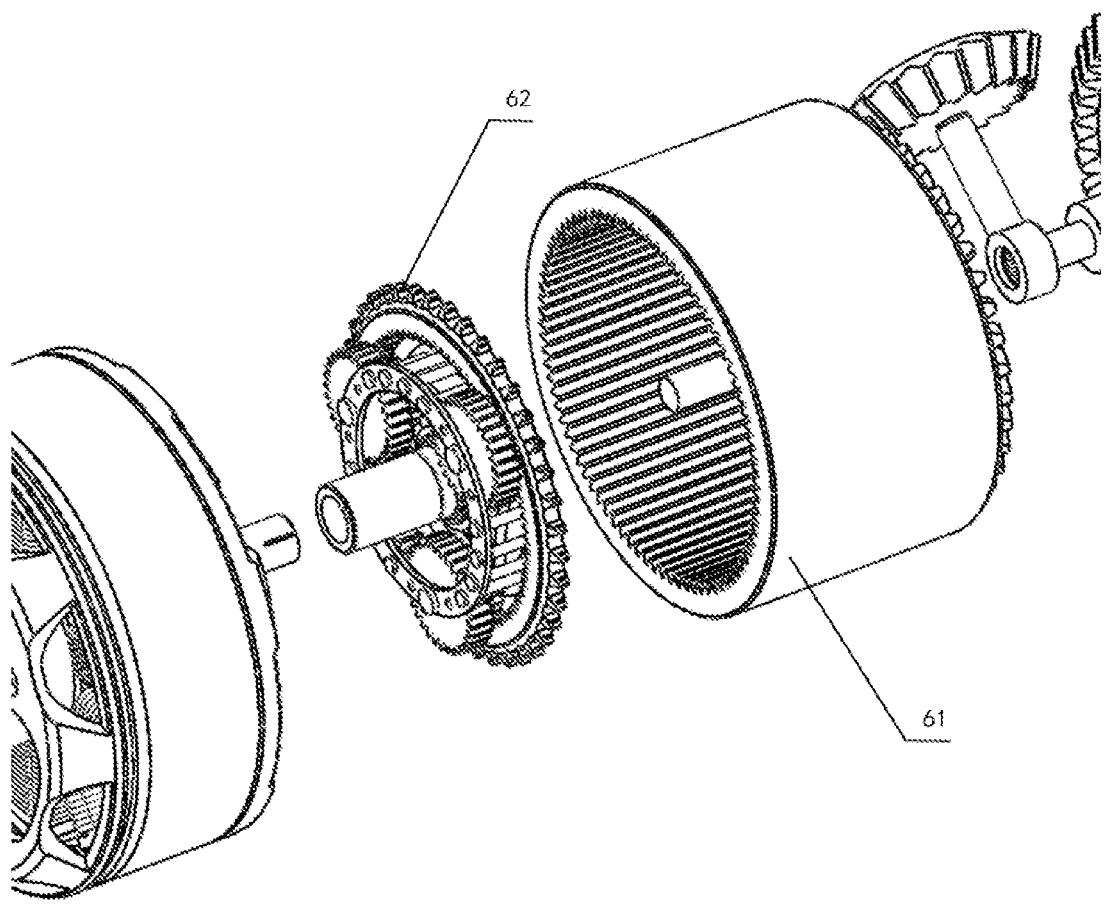
FIG. 4 is a structure drawing of an accelerating device of an atmospheric parameter measuring device in the present disclosure.
Figure 5:
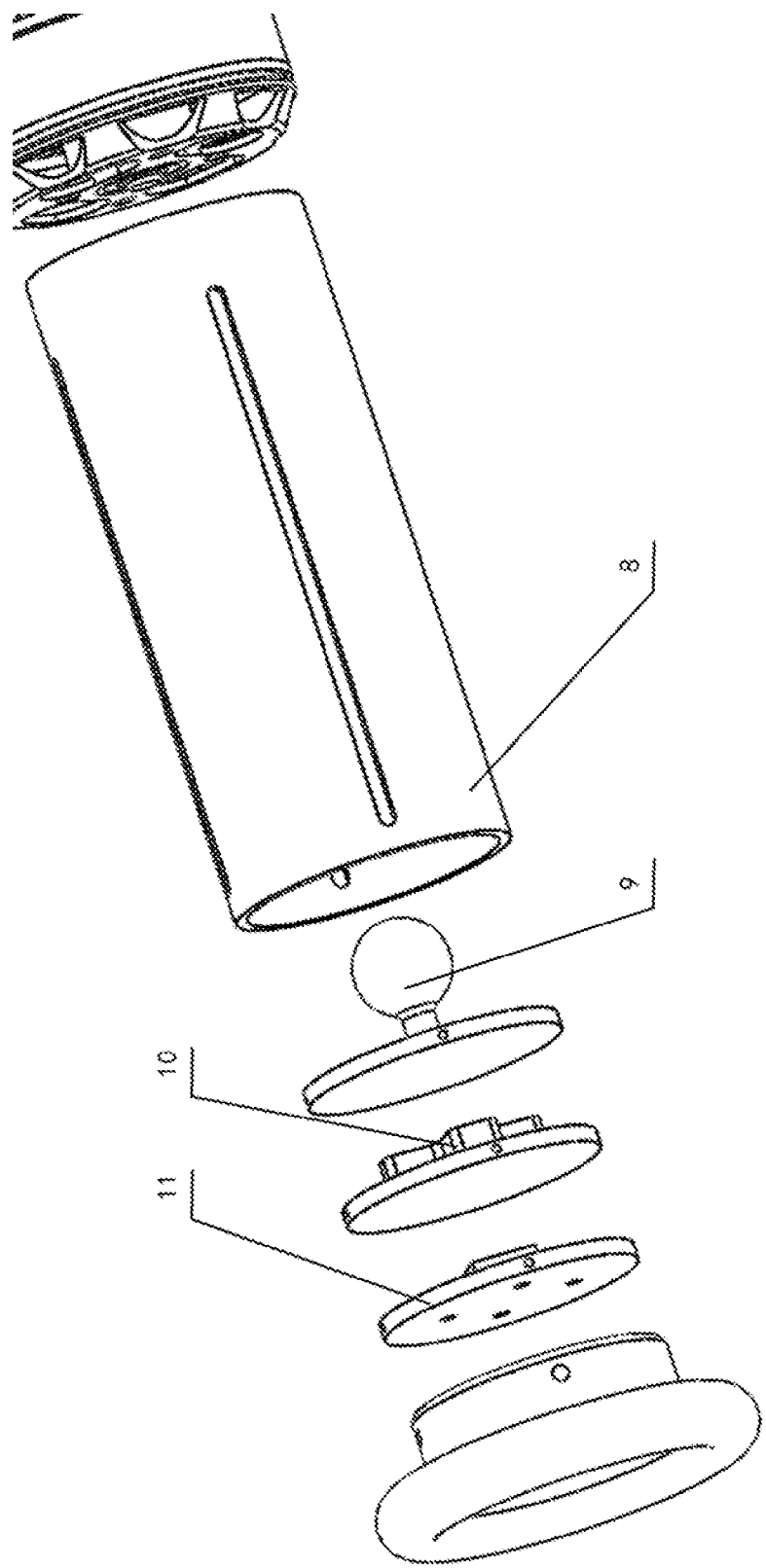
FIG. 5 is a partial enlarged drawing of an atmospheric parameter measuring device in the present disclosure.

As shown in FIG. 3-FIG. 4, the transmission module 5 includes an upper transmission rod 51, a lower transmission rod 52, a ball bearing 53 and a cone gear 54, the upper transmission rod 51 is sleeved outside the lower transmission rod 52, the bottom of the upper transmission rod 51 is a gear plate, the upper propeller 3 is connected to the lower transmission rod 52, the lower propeller 4 is connected to the upper transmission rod 51, the upper propeller 3 delivers the rotation force by the lower transmission rod 52, the lower propeller 4 delivers the rotation force by the upper transmission rod 51, the rotation direction of the upper transmission rod 51 is opposite to that of the lower transmission rod 52, the ball bearing 53 is sleeved at the bottom of the lower transmission rod 52, and the cone gear 54 is sleeved on the ball bearing 53 so as to reduce the frictional force when the cone gear rotates;

The accelerating module 6 includes a gear ring 61 and a star gear 62 meshing with the gear ring 61, the cone gear 54 is capable of meshing with the gear plate at the bottom of the upper transmission rod 51 and the gear ring 61, so as to combine the rotating force of the upper transmission rod 51 and the lower transmission rod 52 and deliver the rotating force to the gear ring 61, and the gear ring 61 drives the star gear 62 to rotate so as to increase the rotating speed;

The star gear 62 is fixedly connected to a rotor of the DC generator 7, so as to drive the rotor of the DC generator 7 to rotate, and cut a magnetic induction line to generate electric energy, and the bottom of the DC generator 7 is fixed with the top of the object-carrying shell 8 by a bolt;

As shown in FIG. 5, the object-carrying shell 8 is a cylindrical empty shell, and four axial slots are uniformly arranged on an outer wall of the object-carrying shell 8; screw holes that correspond to the axial slots of the object-carrying shell 8 are respectively formed outside the inertial generation module 9, the wireless energy-carrying communication module 10 and the sensor carrier 11, and the inertial generation module 9, the wireless energy-carrying communication module 10 and the sensor carrier 11 are movably installed inside the object-carrying shell through the bolt and the axial slots of the object-carrying shell 8, and in layered arrangement; and the installation positions of the inertial generation module 9, the wireless energy-carrying communication module 10 and the sensor carrier 11 can be adjusted flexibly, so as to change the center of gravity of the measuring device and make the floating flying more stable.

Figure 6:
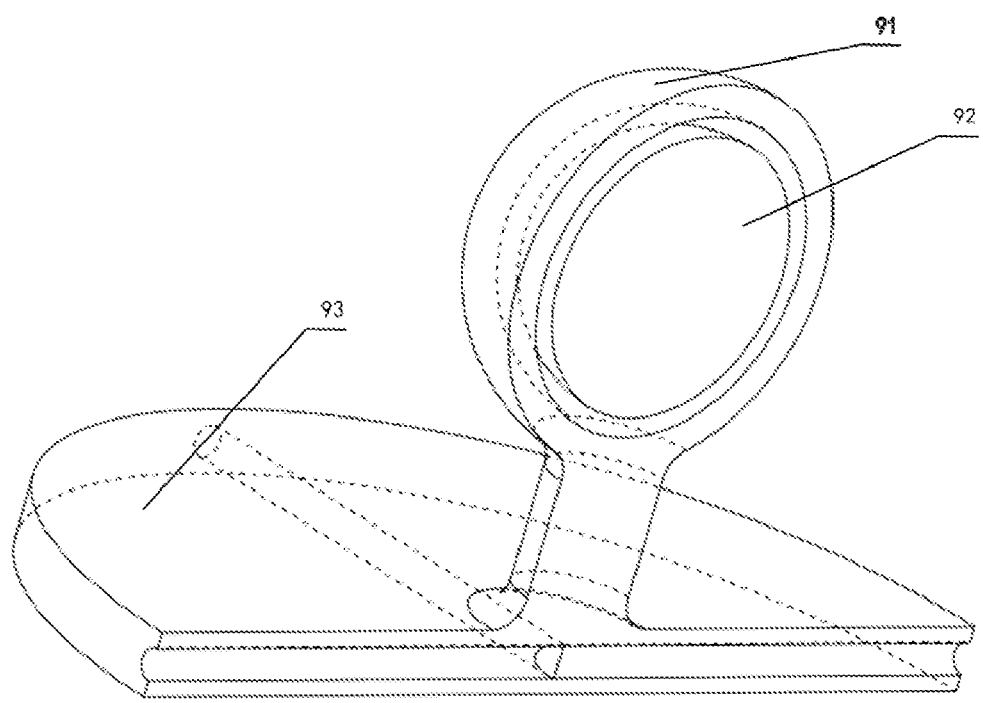
FIG. 6 is a profile map of an inertial generation module of an atmospheric parameter measuring device in the present disclosure.

As shown in FIG. 6, the inertial generation module 9 includes a spherical shell 91 wound with a coil outside, a magnetic solid sphere 92 capable of moving freely in the spherical shell and a chassis 93, when the measuring device floats on upper, lower, left and right sides in the air, the magnetic solid sphere 92 swings, and the magnetic induction line of the spherical shell 91 wound with the coil outside is cut to generate induced electromotive force; and the swinging of the measuring device is converted to electric energy by the inertial generation module 9.

The wireless energy-carrying communication module 10 is configured to collect the energy of wireless electromagnetic wave in the air, at the same time, capable of performing wireless communication with a terminal;

The sensor carrier 11 is configured to carry the low-power-consumption sensor (not shown), the low-power-consumption sensor (not shown) includes a temperature sensor, a humidity sensor, a wind speed sensor, an atmospheric pressure sensor and a cloud and water grain shape sensor; and the base 12 is fixedly connected to the bottom of the object-carrying shell 8 through the bolt.

In some implementation modes, an output end of the DC generator 7 is carried with load with adjustable power, and the rotating speed of the DC generator 7 is controlled by adjusting the load power, and then the floating flying state of the whole measuring device can be adjusted, so as to realize the reverse control.

In some implementation modes, an annular airbag 13 is arranged on the base 12. The airbag 13 can release the colorful smoke to recycle the measuring device conveniently and provide buoyancy force when the measuring device falls into the water, so as to ensure not sink into the water.

In some implementation modes, a layer of solar energy collection material is coated on the surfaces of the cone top 1, the upper propeller 3, the lower propeller 4, the transmission module 5, the accelerating module 6, the object-carrying shell 8 and the base 12, so as to collect solar energy in an environment and supply power for the low-power-consumption sensor (not shown).

In some implementation modes, a frequency band of the wireless electromagnetic wave of the wireless energy-carrying communication module 10 for collecting energy includes a 6G frequency band, and a frequency band with 0.3 GHz-3 THz microwave.

The measuring device is capable of working in the aerospace or the near space or the aviation space.

In the present disclosure, unless specific regulation and limitation otherwise, terms "install", "join", "connect", "fix" and the like should be generally understood, for example, may be a fixed connection, a detachable connection, or integrated, may be a mechanical connection or an electric connection, may be a direct connection or an indirect connection through an intermediation, and may an internal connection of two elements or an interactive relationship of two elements. Those of ordinary skill in the art may understand the specific meaning of the terms in the disclosure according to specific conditions.

In the present disclosure, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right below and obliquely below the second feature, or merely indicates that the horizontal height of the first feature is less than the second feature.

In the present disclosure, the terms "first", "second", "third" and "fourth" are merely used for description, instead of being understood as indicating or implying relative importance. The term, "a plurality of" means two or above two, unless specific limitation otherwise.

The above is only preferred embodiments of the present disclosure and is not intended to limit the present disclosure. Those skilled in the art may make various modifications and variations. Any modifications, equivalent replacements, improvements and the like made within the spirit and principle of the present disclosure shall fall within the scope of protection of the present disclosure.

The invention claimed is:

1. An atmospheric parameter measuring device for air sounding, comprising a cone top (1), a balance rod (2), an upper propeller (3), a lower propeller (4), a transmission module (5), an accelerating module (6), a DC generator (7), an object-carrying shell (8), an inertial generation module (9), a wireless energy-carrying communication module (10), a sensor carrier (11), a base (12), an airbag (13) and a low-power-consumption sensor;

wherein the cone top (1) is connected to the balance rod (2) through a thread, wherein a bottom of the balance rod (2) is successively connected to the upper propeller (3) and the lower propeller (4), wherein the upper propeller and the lower propeller have the opposite rotation directions;

wherein the transmission module (5) further comprising an upper transmission rod (51), a lower transmission rod (52), a ball bearing (53) and a cone gear (54), the upper transmission rod (51) is sleeved outside the lower transmission rod (52), wherein a bottom of the upper transmission rod (51) is a gear plate, wherein the upper propeller (3) is connected to the lower transmission rod (52), wherein the lower propeller (4) is connected to the upper transmission rod (51), wherein the rotation direction of the upper transmission rod (51) is opposite to that of the lower transmission rod (52), wherein the ball bearing (53) is sleeved at the bottom of the lower transmission rod (52), and wherein the cone gear (54) is sleeved on the ball bearing (53);

wherein the accelerating module (6) further comprising a gear ring (61) and a star gear (62) meshing with the gear ring (61), wherein the cone gear (54) is capable of meshing with the gear plate at the bottom of the upper transmission rod (51) and the gear ring (61), to combine the rotating force of the upper transmission rod (51) and the lower transmission rod (52) and deliver the rotating force to the gear ring (61), and wherein the gear ring (61) drives the star gear (62) to rotate so as to increase the rotating speed;

wherein the star gear (62) is fixedly connected to a rotor of the DC generator (7), to drive the rotor of the DC generator (7) to rotate, and cut a magnetic induction line to generate electric energy, and wherein a bottom of the DC generator (7) is fixed with the top of the object-carrying shell (8) by a bolt;

wherein the object-carrying shell (8) is a cylindrical empty shell, and four axial slots are uniformly arranged on an outer wall of the object-carrying shell (8);

wherein screw holes that correspond to the axial slots of the object-carrying shell (8) are respectively formed outside the inertial generation module (9), the wireless energy-carrying communication module (10) and the sensor carrier (11), and the inertial generation module (9), wherein the wireless energy-carrying communication module (10) and the sensor carrier (11) are movably installed inside the object-carrying shell (8) through the bolt and the axial slots of the object-carrying shell (8), and in layered arrangement;

wherein the inertial generation module (9) further comprising a spherical shell (91) wound with a coil outside, a magnetic solid sphere (92) capable of moving freely in the spherical shell and a chassis (93), wherein when the measuring device swings, the magnetic solid sphere (92) rotates, and the magnetic induction line of the spherical shell (91) wound with the coil outside is cut to generate induced electromotive force;

wherein the wireless energy-carrying communication module (10) is configured to collect the energy of wireless electromagnetic wave in the air, at the same time, capable of performing wireless communication with a terminal;

wherein the sensor carrier (11) is configured to carry the low-power-consumption sensor, wherein the low-power-consumption sensor further comprising a temperature sensor, a humidity sensor, a wind speed sensor, an atmospheric pressure sensor and a cloud and water grain shape sensor, and wherein the base (12) is fixedly connected to the bottom of the object-carrying shell (8) through the bolt.

2. The atmospheric parameter measuring device for air sounding according to claim 1, wherein an output end of the DC generator (7) is carried with load with adjustable power, and the rotating speed of the DC generator (7) is controlled by adjusting the load power.

3. The atmospheric parameter measuring device for air sounding according to claim 1, wherein an annular airbag (13) is arranged on the base (12).

4. The atmospheric parameter measuring device for air sounding according to claim 1, wherein a layer of solar energy collection material is coated on surfaces of the cone top (1), the upper propeller (3), the lower propeller (4), the transmission module (5), the accelerating module (6), the object-carrying shell (8) and the base (12), to collect solar energy and supply power for the low-power-consumption sensor.

5. The atmospheric parameter measuring device for air sounding according to claim 1, wherein a frequency band of the wireless electromagnetic wave of the wireless energy-carrying communication module (10) for collecting energy further comprising a 6G frequency band, and a frequency band with 0.3GHZ-3THz microwave.

6. The atmospheric parameter measuring device for air sounding according to claim 1, wherein the measuring device is capable of working in the aerospace or the near space or the aviation space.

7. The atmospheric parameter measuring device for air sounding according to claim 2, wherein an annular airbag (13) is arranged on the base (12).

8. The atmospheric parameter measuring device for air sounding according to claim 2, wherein a layer of solar energy collection material is coated on surfaces of the cone top (1), the upper propeller (3), the lower propeller (4), the transmission module (5), the accelerating module (6), the object-carrying shell (8) and the base (12), to collect solar energy and supply power for the low-power-consumption sensor.

9. The atmospheric parameter measuring device for air sounding according to claim 2, wherein a frequency band of the wireless electromagnetic wave of the wireless energy-carrying communication module (10) for collecting energy further comprising a 6G frequency band, and a frequency band with 0.3 GHZ-3 THz microwave.

10. The atmospheric parameter measuring device for air sounding according to claim 2, wherein the measuring device is capable of working in the aerospace or the near space or the aviation space.

11. The atmospheric parameter measuring device for air sounding according to claim 3, wherein the measuring device is capable of working in the aerospace or the near space or the aviation space.

12. The atmospheric parameter measuring device for air sounding according to claim 4, wherein the measuring device is capable of working in the aerospace or the near space or the aviation space.

13. The atmospheric parameter measuring device for air sounding according to claim 5, wherein the measuring device is capable of working in the aerospace or the near space or the aviation space.

* * * * *